United States Patent
Pitzal et al.

(10) Patent No.: US 7,263,977 B2
(45) Date of Patent: Sep. 4, 2007

(54) METHOD AND DEVICE FOR OPERATING AN INTERNAL COMBUSTION ENGINE IN OVERRUN CONDITIONS

(75) Inventors: Volker Pitzal, Waldstetten/Wissgoldingen (DE); Gerit von Schwertfuehrer, Bieligheim-Bissingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/552,860

(22) PCT Filed: Mar. 11, 2004

(86) PCT No.: PCT/EP2004/050291

§ 371 (c)(1),
(2), (4) Date: Jul. 19, 2006

(87) PCT Pub. No.: WO2004/092565

PCT Pub. Date: Oct. 28, 2004

(65) Prior Publication Data
US 2007/0000477 A1    Jan. 4, 2007

(51) Int. Cl.
*F02D 41/16* (2006.01)

(52) U.S. Cl. ..................................... 123/493

(58) Field of Classification Search ............... 123/493, 123/320, 339.19, 339.22, 339.21
See application file for complete search history.

(56) References Cited

U.S. PATENT DOCUMENTS

| 4,289,222 A | * | 9/1981 | Esthimer ..................... 477/175 |
| 4,630,577 A | * | 12/1986 | Cornacchia ............... 123/179.3 |
| 5,035,216 A | * | 7/1991 | Sakamoto et al. ..... 123/339.13 |

FOREIGN PATENT DOCUMENTS

| DE | 33 01 742 | 7/1984 |
| DE | 198 36 845 | 2/2000 |
| DE | 199 47 052 | 5/2001 |

* cited by examiner

*Primary Examiner*—Hieu T. Vo
(74) *Attorney, Agent, or Firm*—Kenyon & Kenyon LLP

(57) ABSTRACT

A method is provided for operating an internal combustion engine 10 in overrun condition, which method includes the steps of: release of a monitoring of a control signal for a power actuator of the internal combustion engine when predetermined release conditions have been satisfied, which include the exceeding of a release rotary speed of the internal combustion engine; after the release, comparing a control signal for the power actuator of the internal combustion engine to a threshold value, and triggering an error response if the control signal exceeds the threshold value. The method provides that the release speed is varied as a function of the intervention of an idling speed control in the formation of the control signal. Also provided is a control unit which controls such a method.

11 Claims, 2 Drawing Sheets

METHOD AND DEVICE FOR OPERATING AN INTERNAL COMBUSTION ENGINE IN OVERRUN CONDITIONS

FIELD OF THE INVENTION

The present invention relates to a method and a control unit for operating an internal combustion engine in overrun condition.

BACKGROUND INFORMATION

A method and a control unit for operating an internal combustion engine in overrun condition are described in published German patent document DE 33 01 742.

An overrun condition of an internal combustion engine refers to an operation in which the internal combustion engine gives off no torque, but is rather driven itself by external influences. A overrun condition comes about, for example, during braking or during downhill travel of a motor vehicle, when the driver does not call for torque. The transition into overrun condition may be detected, for instance, by a driver command sensor such as an accelerator sensor.

As power actuators, both air metering actuators, such as a throttle valve or a variable valve control, and fuel metering actuators, typically an injection system, come into consideration. As an error response, for example, the output of the power actuator may be deactivated.

Published German patent document DE 33 01 742, which was mentioned above, relates to an electronic Diesel control system for a Diesel engine (EDC). The present invention also relates to an EDC system, but is not limited to that. It may rather also be used in the case of Otto engines having E-gas (electronically controlled throttle valve) or in the case of variable valve control which is being used as a power actuator.

To the extent that mention is made below of an actuating signal, this concept is supposed to include both a pulse width with which a fuel injector is activated in the opening position and a control signal of an air metering power actuator.

In Diesel engines, the torque that is generated is determined largely by the fuel injection quantity. This applies analogously to Otto engines having direct injection in stratified charge operation. In these cases, errors in fuel metering are able to lead to undesired torque generation. An engine torque generated especially in overrun condition may be particularly critical to safety, because it may lead to an insufficient engine braking effect, or even to an undesired acceleration.

In this connection, it is known that one should monitor the duration of activation of the fuel injectors. In the transition to overrun condition, in this context, by letting up on the accelerator, it is monitored whether, above the maximum intervention speed of an idling regulator, injections still occur because of inadmissibly great activation durations.

In the error case, that is, in the case of undesired injections, an error response is initiated. To do this, the activation signal duration is compared to a fixed threshold value. The quantity of the threshold value determines the sensitivity of the error detection. If the threshold value is small, the sensitivity with which genuine errors are detected is great. However, a high sensitivity also leads to the danger that genuine torque requests of an idling speed control may be valued as errors.

The engine torque at which no release for the overrun condition monitoring takes place, that is the release speed, is rather high, specifically to each internal combustion engine, and, as a rule, corresponds to the upper limiting speed of the idling speed control. A typical value of the limiting speed is approximately 2500 min$^{-1}$. The result for the monitoring is that, if there is an undesired presence of torque, the vehicle accelerates using the currently active transmission ratio in the gear box until the release speed is reached.

In view of this background, it is an object of the present invention to provide a method that makes possible an increase in the quality of the monitoring by broadening the monitored operating range of the internal combustion engine without sacrifice in the quality of differentiating between an erroneous and a non-erroneous provision of torque.

SUMMARY

This object is attained in that the release speed is varied as a function of the intervention of an idling speed control in a formation of a control signal, or in that the control unit varies the release speed as a function of the intervention of an idling speed control in a formation of the activating signal.

The present invention incorporates the torque resulting from the idling speed control in the release of the monitoring. If the idling speed control gives the reason for a torque increase which does not tally with the driver's command, the monitoring is released only above an upper speed. In those cases in which the idling speed control does not ask for and/or generate torque, the monitoring is released at a lower release speed. At the average time over a longer period, the time duration during which the monitoring is active is increased. This results in an overall increased monitoring quality.

Particularly in cases in which a torque builds up in an undesired manner, in response to a missing or a slight idling speed control intervention, this is detected earlier and may be reacted to earlier. As a result, one may intervene even before the vehicle has accelerated to the maximum speed of the idling speed control in the gear that was just shifted in. This makes it possible largely to avoid an undesired acceleration.

If, on the other hand, a subfunction of the engine control erroneously requests a buildup in torque, when at the same time the idling speed control requests torque in a permissible manner, this error has no negative results, and thus it is not disadvantageous that monitoring is permissible only above the upper release speed.

The release speed may be selected from at least two values.

This embodiment is simple to implement and it provides a considerable increase in monitoring quality.

It may be implemented that the higher of the at least two possible values is independent of the intervention of the idling speed control.

This embodiment has the advantage that, for example, even errors of the idling speed control itself may be detected, so that an erroneously large intervention of the idling speed control is not able to block the release of the monitoring.

It may also be implemented that, below the lowest of the at least two possible values no release is permitted.

This embodiment takes into consideration that the interventions of the idling speed control take place frequently at low speeds, and may be subject to large torque requests, so that a release of monitoring at low speeds, perhaps below approximately 1500 min$^{-1}$ does not appear meaningful.

Furthermore, it may be implemented that exactly two values are possible for the release speed, the lower of the two values being selected if the intervention of the idling speed control does not exceed a predetermined threshold value.

This embodiment is also very simple to implement and provides a considerable increase in monitoring quality.

One alternative example embodiment provides that at least three values are possible for the release speed, one of the at least two lower values being selected if the intervention of the idling speed control undershoots a threshold value which in each case is individually assigned to one of the lower values.

It may also be provided that the release speed is selected by access to a characteristics curve which is addressed together with the intervention of the idling speed control.

These embodiments make possible an additional increase of the monitoring quality by a multi-step or even a continuous variation of the dependence of the release speed on the intervention of the idling speed control.

It may also be provided that the intervention of the idling speed control is recorded in the control loop of the idling speed control, before or after the formation of an actuating variable.

With a view to the fact that the idling speed control works in a closed circuit, the intervention of the idling speed control may be estimated from signals at various points of the circuit. Thus the actuating variable itself or a system deviation may be used. Besides, it is unimportant whether the intervention is determined on the basis of torque or quantity, since the two variables are linked to each other via the engine efficiency. The calculations in the control unit generally take place depending on the physical connection in torque unit (driver command torque, torque limitation, . . . ) or quantity unit or activating signal unit (smoke limitation, quantity equalization regulation). The connection takes place via an engine efficiency characteristics map. Therefore, the considerations mentioned in the present specification for torque, are equivalent to corresponding views on quantities (fuel quantities, air quantities).

The use of a control unit for controlling the overrun condition of an internal combustion engine may also be provided, the activating signal being an injection pulse width for a fuel injector or an actuating signal for an air-metering actuating mechanism.

DETAILED DESCRIPTION

Figure 1:
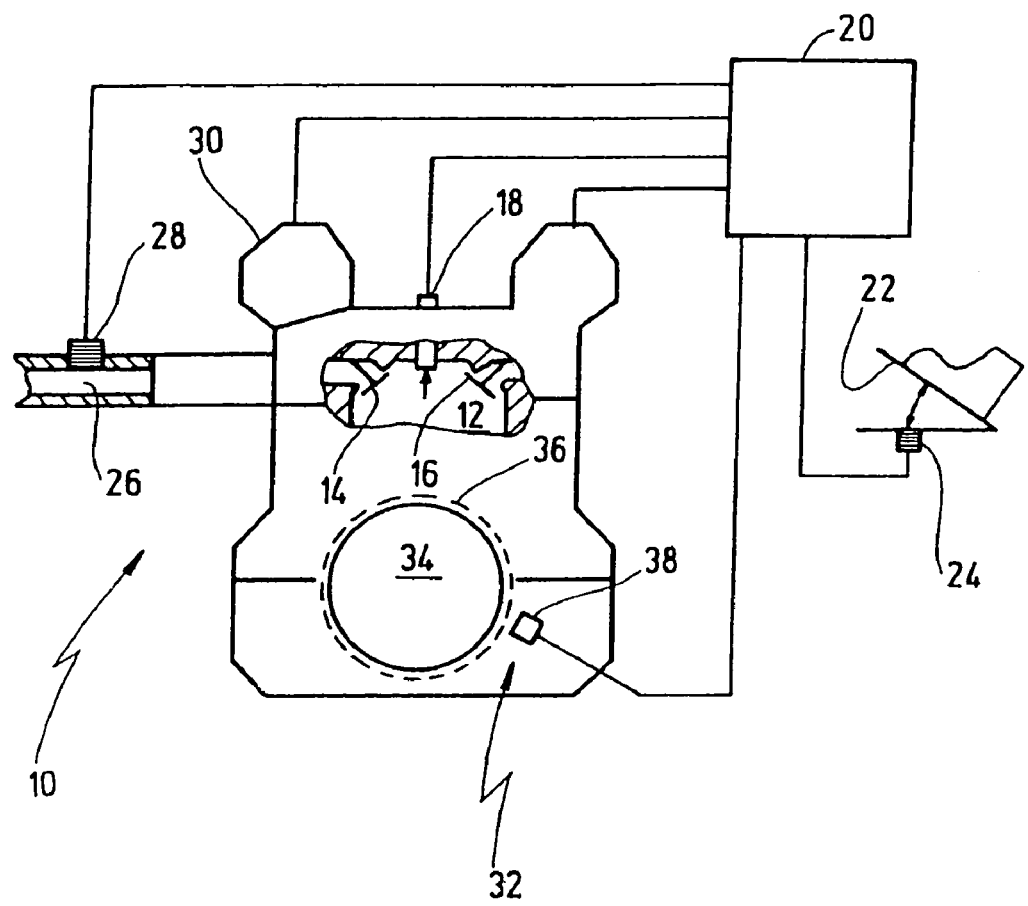
FIG. 1 illustrates schematically an internal combustion engine having actuators, a sensor system and a control unit.

The number 10 in FIG. 1 denotes the overall view of a schematically shown internal combustion engine having at least one combustion chamber 12. A charge of combustion chamber 12 is exchanged via an intake valve 14 and a discharge valve 16. Added to an air charge of combustion chamber 12, fuel is metered in via fuel injector 18, the time of metering in and the quantity metered in being controlled by a control unit 20. In this context, fuel injector 18 is used as a power actuator. The quantity metered in determines the torque generated by internal combustion engine 10. The activation of the power actuator takes place, among other things, as a function of a driver command, which is recorded via an accelerator 22 by an accelerator sensor 24 and conducted on to control unit 20.

Such power control is typical for a Diesel engine. A comparable power control via the quantity of the fuel metered in takes place also in an Otto engine having direct injection in an operation having stratified combustion chamber charging. In contrast to the Diesel engine, in which the fuel injection triggers combustion, in the Otto engine an externally supplied ignition of the combustion chamber charge takes place, for instance, by a spark plug. In an Otto engine having direct injection, which is operated in homogeneous operation, that is, having a homogeneous mixture distribution in combustion chamber 12, the setting of the desired torque takes place as a function of the driver's command concerning the quantity of the charge of combustion chamber 12.

This applies analogously also to an internal combustion engine having manifold injection. In these cases, the quantity of combustion chamber charge is able to be set via a throttle valve 26, which is operated by a throttle valve actuator 28 in a controlled manner by control valve 20. In this case, throttle valve 26 is used together with throttle valve actuator 28 as a power actuator. Alternatively, the quantity of the charge of combustion chamber 12 may also come about via a variable control of intake valve 14 by an intake valve actuator 30, which is also controlled by control unit 20. Internal combustion engine 10 also has a rotary speed sensor system 32, which may be made up, for instance, by a pulse-generator wheel 34 having ferromagnetic markings 36 and an inductive sensor 38.

With a view to the monitoring, for example, a certain throttle valve opening angle would correspond to an activation duration of a fuel injector 18, since both variables, in their respective technical environment, substantially determine the torque of internal combustion engine 10. In a variable valve control, the activation period or the valve lift may be the appropriate criterion.

Figure 2:
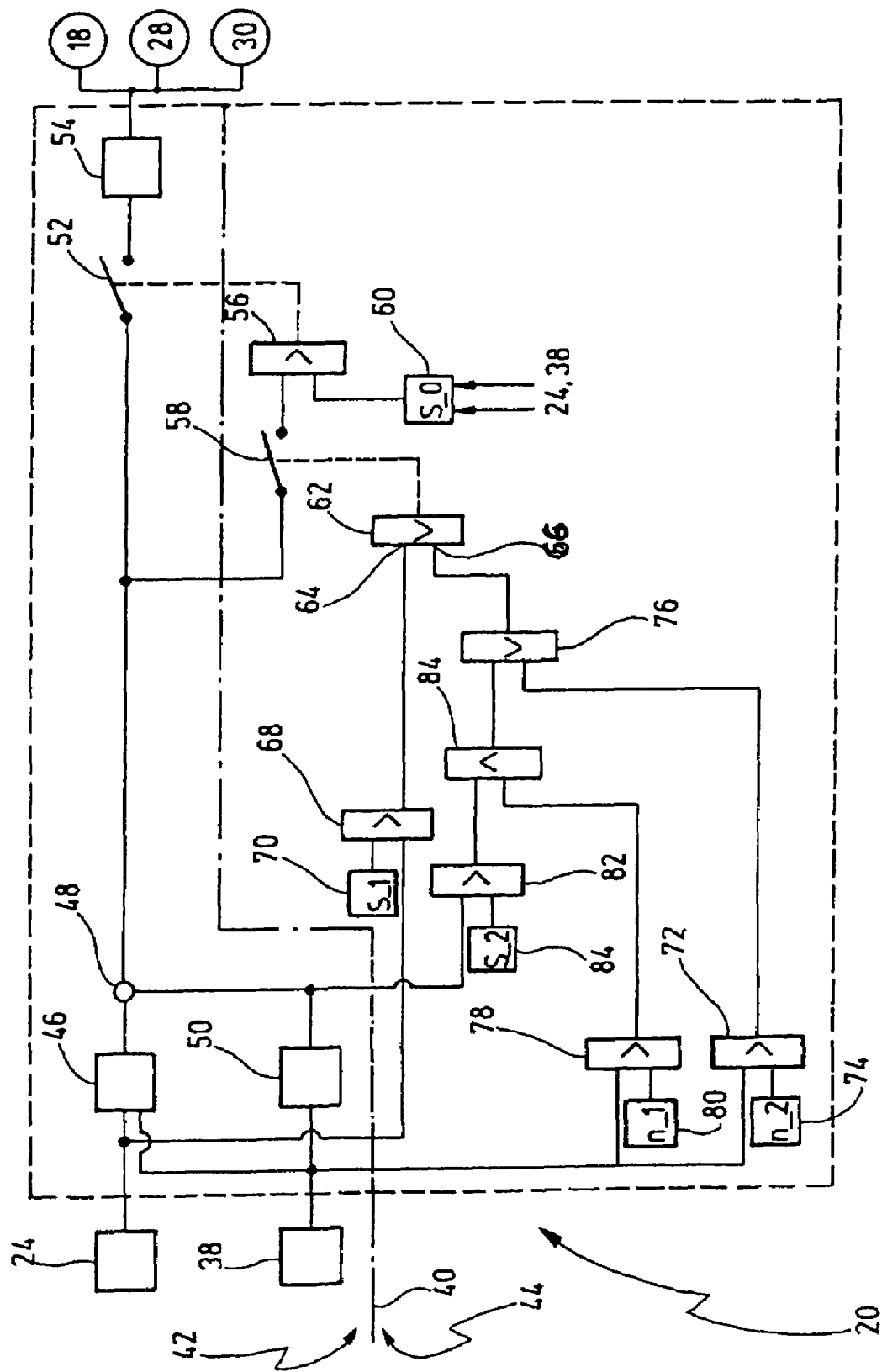
FIG. 2 shows an exemplary embodiment of the method according to the present invention, and a control unit according to the present invention, in the form of functional block.

FIG. 2 shows an exemplary embodiment of the method according to the present invention, and a control unit according to the present invention, in the form of functional blocks.

Control unit 20 is subdivided according to function by a line 40 into a first, upper level 42 and a second, lower level 44. In this context, this subdivision corresponds to the program structure of the engine control program, which is executed in control unit 20. On the input side, signals of various sensors are supplied to control unit 20, e.g., signals of accelerator sensor 24 and inductive sensor 38. In first level 42, control signals are formed from these signals format least one of power actuators 18, 28 or 30, to which the control unit is connected on its output side. Second program level 44 is used for monitoring the first level. The two levels are functionally coupled to each other. Thus, second level 44 receives, for example, a power-determining signal from the chain for the formation of the control signal for power actuators 18, 28 or 30 in level 1. If the monitoring of this signal in level 2 detects an implausibility critical to safety, level 2 may intervene in level 1, in order, for instance, to prevent or reduce a torque increase in internal combustion engine 10 that is critical to safety.

In level 1, first of all a desired torque or a desired quantity is calculated in a block 46, based on the driver's command (accelerator sensor 24) and the rotary speed (inductive sensor 38). In this context, the concept of desired quantity refers to the quantity of the power-determining working medium of internal combustion engine 10. This may be a fuel quantity that is to be injected, which is metered in via fuel metering valves 18. Alternatively or supplementarily, this desired quantity may also refer to the charge of combustion chamber 12 with air or with fuel/air mixture. The charge of combustion chamber 12 is set by appropriate control of throttle valve actuator 28 or intake valve actuator 30. Desired torque and desired quantity are linked with each other via the engine efficiency, and are therefore alternatively usable. In the linkage 48 of desired torque/desired quantity thus formed, the intervention of an idling speed control 50 is superimposed, which was formed based on the rotary speed signal of inductive sensor 38. The linkage 48 may be additive or multiplicative. The result of the linkage in block 48 is passed on, via a first switch 52 that is closed in the normal case, to a block 54, which represents the final control signal formation and output in control unit 20. The output signal of block 54 is used for controlling at least one of the power-determining actuators 18, 28 and/or 30 from FIG. 1.

This function of control signal production and control signal formation from first program level 42 in control unit 20 is checked by second program level 44. For this purpose, the result of the linkage in block 48 of level 1 is compared to an admissible or plausible value S_0, which is made available by block 60. To block 60, for example, both the signals of accelerator sensor 24 and speed sensor system 32 may be supplied, so that block 60, by reproduction of the functions of blocks 46, 48 and 50 from the first level and adding an offset, is able to form the value S-0 for a most admissible quantity signal or desired torque signal. If the signal actually formed in the first level, that is present via switch 58, is greater than the most reliable value S-0, block 56 opens switch 52 in the first level. Block 54 in the first level then gives out substitute values to power actuators 18, 28 and/or 30, in order to prevent an undesired torque increase or an undesired availability of torque. Alternatively, deactivation of block 54 also comes into consideration, so that no control signal is emitted. This releases the monitoring of first level 42 by second level 44, by closing second switch 58.

How this release takes place is described in the following.

The signal of inductive sensor 38 is supplied to a compare block 72, to which, in parallel, a value n_2 of a higher release speed is supplied. Higher release speed n_2 may, for instance, correspond to the upper limiting speed, below which idling speed control 50 is active in first level 42. If the actual speed of the internal combustion engine is greater than this speed n_2, which may be, e.g., 2300 min$^{-1}$, idling speed control 50, under normal circumstances, does not make a torque-increasing intervention at linkage 48 in first level 42. Therefore, no interventions of idling speed control 50 are superimposed on the formation of control signals for power actuators 18, 28 and/or 30, which could interfere with monitoring of the control signal formation in first level 42.

Compare block 72 in this case, for example, outputs a logical 1 which is supplied via OR operation 76 to a second input 66 of aforementioned logical AND operation 62. In parallel to this, the signal of a compare block 68 is supplied to a first input 64 of linkage 62. The signal of compare block 68 is logically 1 if the torque command of the driver is below a threshold S_1, which is made available by block 70. In this context, the driver command signal is made available by accelerator sensor 24. For example, block 68 emits a logical 1 if the accelerator angle is equal to 0. If, at the same time, the engine speed is greater than n_2, block 62 releases the monitoring by closing second switch 58.

According to the present invention, alternatively or supplementarily to the fixed release speed n_2, a release speed is used which is variable as a function of the intervention of idling speed control 50 in the formation of the control signal in blocks 46, 48 and 54 of first level 42.

For this, in the embodiment of FIG. 2, the output signal of idling speed control 50, in addition to its further processing in first level 42, is also passed on to second level 44. In second level 44, it is supplied to a compare block 82, which has a threshold value S_2 supplied to it in parallel. S_2 is equivalent to a threshold value for the intervention of idling speed control 50, which separates values that are still tolerable from those that are no longer tolerable for a release. If the intervention of idling speed control 50 is, for instance, relatively small, that is, smaller than threshold value S_2, compare block 82 passes a logical 1 to a post-connected AND operation 84. To this AND operation 84, the output signal of compare block 78 is supplied, in which the rotary speed of internal combustion engine 10, that is, the signal of inductive sensor 38, is compared to a lower release speed n_1. The value n_1 may, for instance, correspond to the upper limiting speed of a precontrol of idling speed control 50, such as ca 1500 min$^{-1}$. The value n_1 is produced in FIG. 2 by block 80. In this context, block 80, as described, may give out a fixed value. Alternatively, block 80 may represent a characteristics curve to which, deviating from the representation in FIG. 2, the intervention of idling speed control 50 is supplied, and which gives out a value n_1 that is a constant or stepwise function of this intervention. In the result, above this lower release speed n_1, at simultaneously small intervention of idling speed control 50, monitoring of the control signal formation in first level 42 is then also permitted, in which the output signal of compare block 84 closes switch 58 via OR operations 76 and 62.

Figure 3:
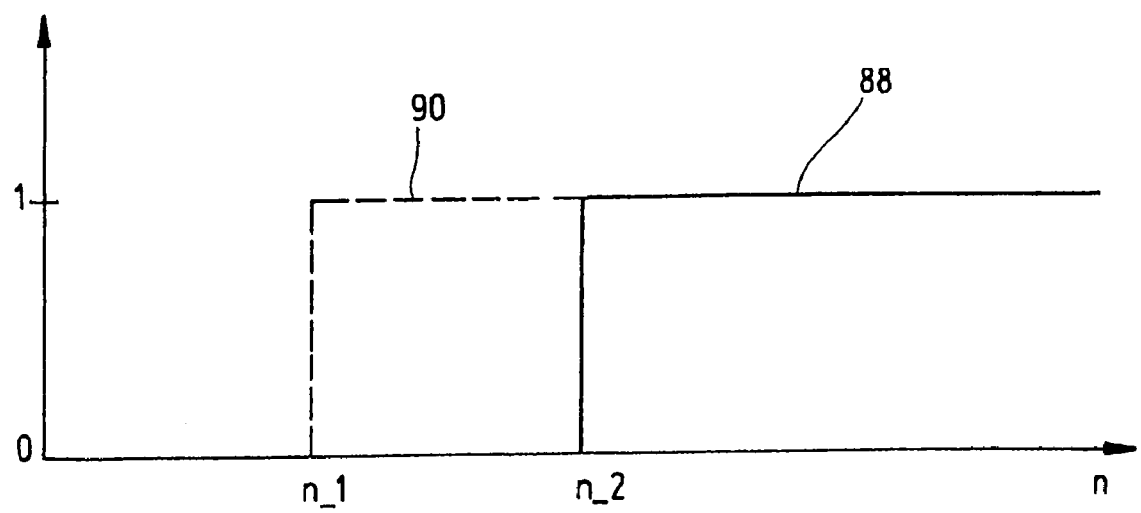
FIG. 3 shows speed ranges in which the monitoring is active.

FIG. 3 illustrates the effect of the present invention for the representation of speed ranges in which a release is possible according to the related art or according to the present invention shown here. In this context, the value 0 is equivalent to blocking, and the value 1 is equivalent to a release of the monitoring. Solid line 88 in FIG. 3 represents the related art. According to the related art, the monitoring was released only above a comparatively high speed n_2. Dashed line 90 makes clear how, within the scope of the present invention, a release is possible even at a lower speed n_1. The assumption is, as was shown farther above, that in the speed range between n_1 and n_2, which, according to the present invention, is now also accessible to a monitoring, only a comparatively small intervention of idling speed control 50 is present.

What is claimed is:

1. A control unit for operating an internal combustion engine in overrun condition, comprising:
   an arrangement for monitoring a control signal for a power actuator of the internal combustion engine;
   an arrangement for releasing the monitoring when predetermined release conditions are met, and wherein the release conditions include exceeding of a release speed of the internal combustion engine;
   an arrangement for comparing, after the release, a control signal for the power actuator of the internal combustion engine to a threshold value; and
   an arrangement for triggering an error response if the control signal exceeds the threshold value; wherein the control unit varies the release speed as a function of an intervention of an idling speed control in formation of the control signal.

2. The control unit as recited in claim 1, wherein the released speed is selected from at least two values.

3. The control unit as recited in claim 1, wherein the control signal is one of an injection pulse width for a fuel injection valve and a command signal for an actuator that meters in air.

4. A method for operating an internal combustion engine in overrun condition, comprising:
  monitoring a control signal for a power actuator of the internal combustion engine, wherein the monitoring is released when predetermined release conditions are met, and wherein the release conditions include exceeding of a release speed of the internal combustion engine;
  after the release, comparing the control signal for the power actuator of the internal combustion engine to a threshold value; and
  triggering an error response if the control signal exceeds the threshold value;
  wherein the release speed is varied as a function of an intervention of an idling speed control in formation of the control signal.

5. The method as recited in claim 4, wherein the release speed is selected from at least two values.

6. The method as recited in claim 5, wherein the highest of the at least two values is independent of the intervention of the idling speed control.

7. The method as recited in claim 5, wherein no release of the monitoring is permitted below the lowest of the at least two possible values.

8. The method as recited in claim 7, wherein the release speed is selected from exactly two values, the lower of the two values being selected if the intervention of idling speed control does not exceed a predetermined threshold value.

9. The method as recited in claim 7, wherein the release speed is selected from at least three values, one of two lower values being selected if the intervention of the idling speed control undershoots a threshold value that is individually assigned respectively to one of the lower values.

10. The method as recited in claim 4, wherein the release speed is selected by accessing a characteristics curve that is addressed using the intervention of the idling speed control.

11. The method as recited in claim 4, wherein the intervention of the idling speed control is recorded in a control loop of the idling speed control one of before and after formation of an actuating variable.

* * * * *